Figure 1:
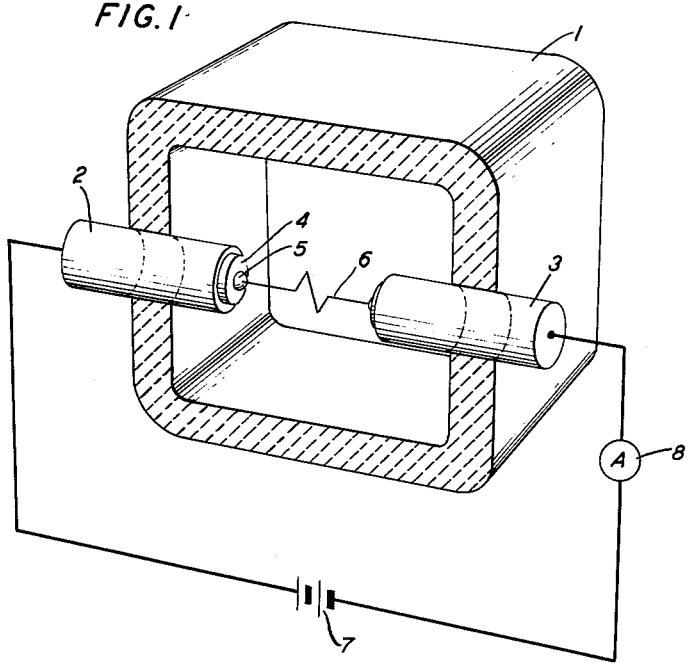

Aug. 24, 1965

A. G. CHYNOWETH ETAL 3,202,912
METHOD OF UTILIZING TUNNEL DIODES TO DETECT
CHANGES IN MAGNETIC FIELDS
Filed May 5, 1960

INVENTORS A. G. CHYNOWETH
R. A. LOGAN
BY
ATTORNEY

3,202,912
METHOD OF UTILIZING TUNNEL DIODES TO DETECT CHANGES IN MAGNETIC FIELDS

Alan G. Chynoweth, Summit, and Ralph A. Logan, Morristown, N.J., assignors to Bell Telephone Laboratories, Incorporated, New York, N.Y., a corporation of New York
Filed May 5, 1960, Ser. No. 27,207
1 Claim. (Cl. 324—43)

This invention relates to a procedure for measuring the strength of magnetic fields. Further it relates to a procedure for detecting or measuring small variations or fluctuations in magnetic fields. These measurements are made through the use of particular diodes in which the diode current is determined by the strength of the magnetic field. The diodes according to this invention are so-called "tunnel" diodes, i.e., diodes in which the predominant current generating mechanism is by internal field emission. Such diodes are characterized by having both the n and p regions so heavily doped that the Fermi energy level lies above the conduction-band edge in the n region and below the valence-band edge in the p region.

The transition region between the n and p type sides sets up a potential barrier opposing the flow of electrons at constant energy. However, quantum-mechanically, electrons may tunnel through this barrier and so pass from the conduction band to the valence band, or vice versa. The tunneling probability is principally determined by two characteristics of the semiconductive material, the energy gap and the effective mass. It has been found that these properties, particularly the energy gap, exhibit significant variations with changes in magnetic field strength. Consequently, the tunneling probability reflects the strength of the magnetic field. Since a reliable relationship exists between the diode current and the tunneling probability, the diode current presents a useful means for measuring the strength of magnetic fields.

The present invention accordingly has for its object the use of tunnel diodes as magnetic field detectors. Detection of small magnetic disturbances finds important uses such as in geophysical prospecting and in military uses, for instance, submarine detection. Also laboratory and testing equipment require sensitive and reliable magnetic field detectors.

To estimate the sensitivity of the device use is made of the following equations. The field emission current is given by $$I = A \exp.-\frac{[\alpha(\epsilon_0+\beta H)^{3/2}]}{E} \quad (1)$$

where $\epsilon_0$ is the energy gap in electron volts, H is the magnetic field strength in gauss and E is the electric field in the junction in volts per centimeter, and where $\alpha$ and $\beta$ are constants further defined as follows:

$$\alpha = \frac{\pi(m^*)^{1/2}}{2eh} \quad (2)$$

where $m^*$ is the effective mass in grams, $e$ is the electron charge in coulomb and $h$ is $h/2$ where $h$ is Planck's constant. The constant $\beta$ is the slope of the linear line relating the energy gap $\epsilon_0$ to the field H. This value remains constant such that a linear relationship exists between these parameters at least at fields of the order of 250 kilogauss.

For $InSb$, $\beta$ is approximately $1.5 \times 10^{-7}$ ev./gauss.

The electric field for a step junction may be represented by $$E = \frac{2(V_T)^{1/2}}{W_1} \quad (3)$$

where $V_T$ is the potential drop across the junction in volts and is approximately equal to the energy gap when no external voltage is applied, and $W_1$ is the width constant, i.e., the width of the junction for unity potential difference across it. For the width constant and energy gap definition or derivation see "The Theory of p-n Junctions in Semi-Conductors and p-n Junction Transistors," by Shockley, Bell System Technical Journal, volume 28, July 1949. For present purposes, it is advantageous to use $InSb$ due to its low energy gap and light effective mass. For this material, $V_T \sim 0.2$ volt and, by way of example, $W_1$ can be 500 A. From Equation 1 it follows that $$\frac{\Delta I}{I} = \frac{3}{4}\frac{\alpha\epsilon_0^{3/2}\beta}{(V_T)^{1/2}\epsilon_0^{5/2}}\Delta H \quad (4)$$

For $InSb$, $\alpha\epsilon_0$ is $10^6$ volts/cm., so that $$\frac{\Delta I}{I} = 5 \times 10^{-5}\Delta H \quad (5)$$

From Equation 5 it follows that for a diode carrying a current of 100 ma., the detection of an unbalance current in the above circuit of $10^{-9}$ amps would be produced by a $\Delta H$ of $\sim 10^{-4}$ gauss.

The procedure of this invention, therefore, is capable of detecting fields as small as $10^{-4}$ gauss. Even smaller fields are measurable depending upon the sensitivity of the current measuring means. From the above equations it will be seen that certain factors, e.g., the energy gap value and the effective mass also affect the response of the device. Consequently, judicious selection of the diode according to these characteristics will further increase the sensitivity. Since the linear variation of $\epsilon_0$ with H is reliable up to at least 250 kilogauss as previously stated it is possible to measure fields at least as large as 250 kilogauss using this procedure.

Accordingly, this invention provides a method for detecting a broad range of magnetic fields with a sensitivity which compares with the best known devices now in use.

Figure 2:
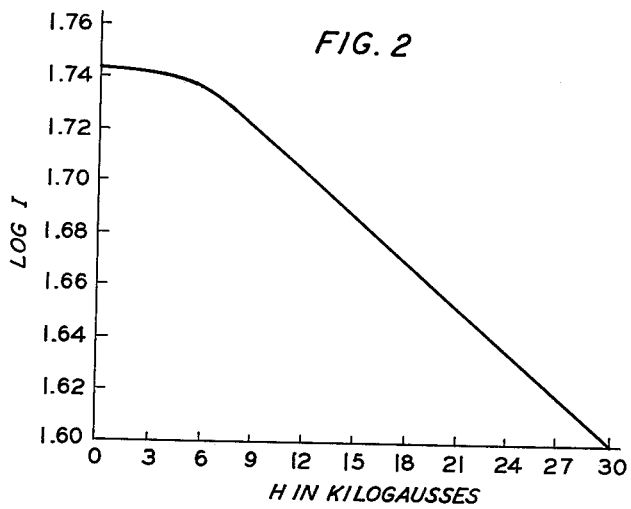

The specific aspects of the invention can perhaps be better understood when considered in conjunction with the drawing in which:

FIG. 1 is a front elevation partly in section of the diode detector with an accompanying schematic circuit diagram; and FIG. 2 is a plot of the logarithm of the current versus the magnetic field showing the current dependency on magnetic field for a particular diode according to one specific embodiment.

Referring first to FIG. 1, a nonmagnetic bracket 1 of ceramic material, for instance, supports pins 2 and 3 also of nonmagnetic conductive material, for instance, brass. Attached to pin 2 by solder or other appropriate means is a semiconductor wafer 4 having an alloyed junction formed with semiconductive dot 5. Spring contact 6 completes the circuit. The semiconductive materials 4 and 5 may be any of various known compositions with any appropriate doping level so long as the predominant current-carrying mechanism of the junction is through internal field emission, i.e., tunneling. Such tunnel diodes are now well known to the art. The device is then connected in a circuit including a current source 7 at constant voltage and ammeter 8. Alternatively, a Wheatstone bridge circuit may be used to detect the current fluctuations in the diode according to well-known procedures. The device is then subjected to a magnetic field and the attendant current flow observed on the ammeter. It is obvious that absolute values of field strength may be measurable as well as variations. Empirical calibrations are most dependable; however, values may be predicted directly from the equations such as those set forth above.

The following example is included as a specific embodiment of the invention:

A device similar to that depicted in FIG. 1 was employed. The particular diode was fabricated using a wafer of indium antimonide doped with $10^{16}$/cc. excess donors at liquid $N_2$. A 3 mil dot of cadmium indium alloy was alloyed to the wafer at 310° C. The current source provided a constant voltage of .08 volt in the forward bias direction. The device, maintained at the temperature of liquid $N_2$ (77.6° K.), was subjected to a varying magnetic field and the variations of current in milliamperes were measured on an ammeter. The results of this run are plotted in FIG. 2. The ordinate is plotted as the logarithm of the current in ma. since this provides a linear relationship with magnetic field strength in kilogauss (abscissa).

It is seen that for low magnetic field strengths, up to about 6 kilogauss, the current variation is not responsive in the degree shown by the remainder of the curve. Consequently, when low fields (below 6 kilogauss) are to be measured, the device should be biased with a sufficient field strength to ensure that the measurement will be made in the linear part of the curve. A bias of at least 9 kilogauss in the present embodiment is preferred.

Further advantages reside in the present device such as its probe size, ease and economy of manufacture, speed of response (of a magnitude of $10^{-10}$ sec.), and range of fields ($\sim 10^9$ gauss). Also, it has been found that these devices operate independently of field orientation.

It is evident that the techniques described here are applicable to diodes made of any semiconducting material so long as tunneling occurs. The equations set forth above indicate that low effective electron mass and low energy gap values improve the diode response. With these considerations in mind, various materials can be employed including those diodes which operate at room temperatures, for instance, indium arsenide. The tunnel diodes have a further and significant advantage in that they are also relatively insensitve to ambient temperature variations.

What is claimed is:

A method of measuring magnetic field strengths which consists essentially of electrically biasing in the forward direction a diode in which the predominant current generating mechanism is by internal field emission, subjecting said diode to a varying magnetic field to be measured whereby the current in the diode is altered and measuring the resultant current flow.

References Cited by the Examiner

UNITED STATES PATENTS

| | | | |
|---|---|---|---|
| 2,908,871 | 10/59 | McKay | 317—234 |
| 2,914,728 | 11/59 | Brophy et al. | 324—45 |
| 2,916,639 | 12/59 | Krembs | 307—88.5 |
| 2,944,167 | 7/60 | Matare | 317—235 X |
| 3,090,014 | 5/63 | Dacey | 307—88.5 |
| 3,093,755 | 6/63 | Haberecht | 317—234 |

OTHER REFERENCES

I.B.M. Technical Disclosure Bulletin, vol. 2, No. 5, February 1960, pp. 59 and 60.

WALTER L. CARLSON, *Primary Examiner.*

LLOYD McCOLLUM, *Examiner.*